United States Patent
Chang (10) Patent No.: US 7,046,529 B2
(45) Date of Patent: May 16, 2006

(54) VOLTAGE ADAPTER CAPABLE OF CONSERVING POWER CONSUMPTION UNDER STANDBY MODE

(75) Inventor: Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/984,730

(22) Filed: Nov. 9, 2004

(65) Prior Publication Data
US 2005/0248968 A1   Nov. 10, 2005

(30) Foreign Application Priority Data
May 10, 2004   (TW) ................................ 93113074 A (51) Int. Cl.
*H02M 1/12* (2006.01)
(52) U.S. Cl. ........................................................ 363/44
(58) Field of Classification Search ................. 363/34, 363/37, 39, 44, 45, 47, 52, 53, 125, 127

See application file for complete search history.

(56) References Cited

U.S. PATENT DOCUMENTS

| | | | | |
|---|---|---|---|---|
| 4,860,185 A | * | 8/1989 | Brewer et al. | 363/41 |
| 6,163,470 A | * | 12/2000 | Chavez et al. | 363/53 |
| 6,493,242 B1 | * | 12/2002 | Riggio et al. | 363/16 |
| 6,937,490 B1 | * | 8/2005 | MacDonald et al. | 363/142 |
| 6,949,915 B1 | * | 9/2005 | Stanley | 323/207 |
| 6,952,355 B1 | * | 10/2005 | Riggio et al. | 363/21.15 |

* cited by examiner

*Primary Examiner*—Adolf Berhane
(74) *Attorney, Agent, or Firm*—Madson & Austin (57) ABSTRACT

A voltage adapter characterized by an advantage of reducing unnecessary power loss induced in standby mode operation and conserving the overall power consumption accordingly. The voltage adapter according to the present invention receives an input voltage and converts the input voltage into an output voltage having a voltage level different from the input voltage, and comprises an EMI filter for suppressing a differential mode noise in the input voltage, a bridge rectifier for performing a full-wave rectification to the input voltage, a transistor switch, a driver for controlling on/off operations of the transistor switch according to a feedback amount derived from the output voltage, and a circuit box for providing a discharge path for the EMI filter, while sampling the input voltage to detect a variation of the input voltage.

15 Claims, 7 Drawing Sheets

VOLTAGE ADAPTER CAPABLE OF CONSERVING POWER CONSUMPTION UNDER STANDBY MODE

FIELD OF THE INVENTION

The present invention relates to a voltage adapter, and more particularly to a voltage adapter which is able to conserve power consumption under standby mode.

BACKGROUND OF THE INVENTION

Generally speaking, a voltage adapter, more particularly an AC/DC adapter, is used to receive a commercially available alternating-current (AC) power and convert the AC power into a direct-current (DC) power in order to enable a DC/DC converter to transform a high-level DC voltage into various low-level DC voltages, and thereby operating an electronic device. The electronic device which is adapted to cooperate with a DC power source can be, for example, a desktop computer.

Figure 1:
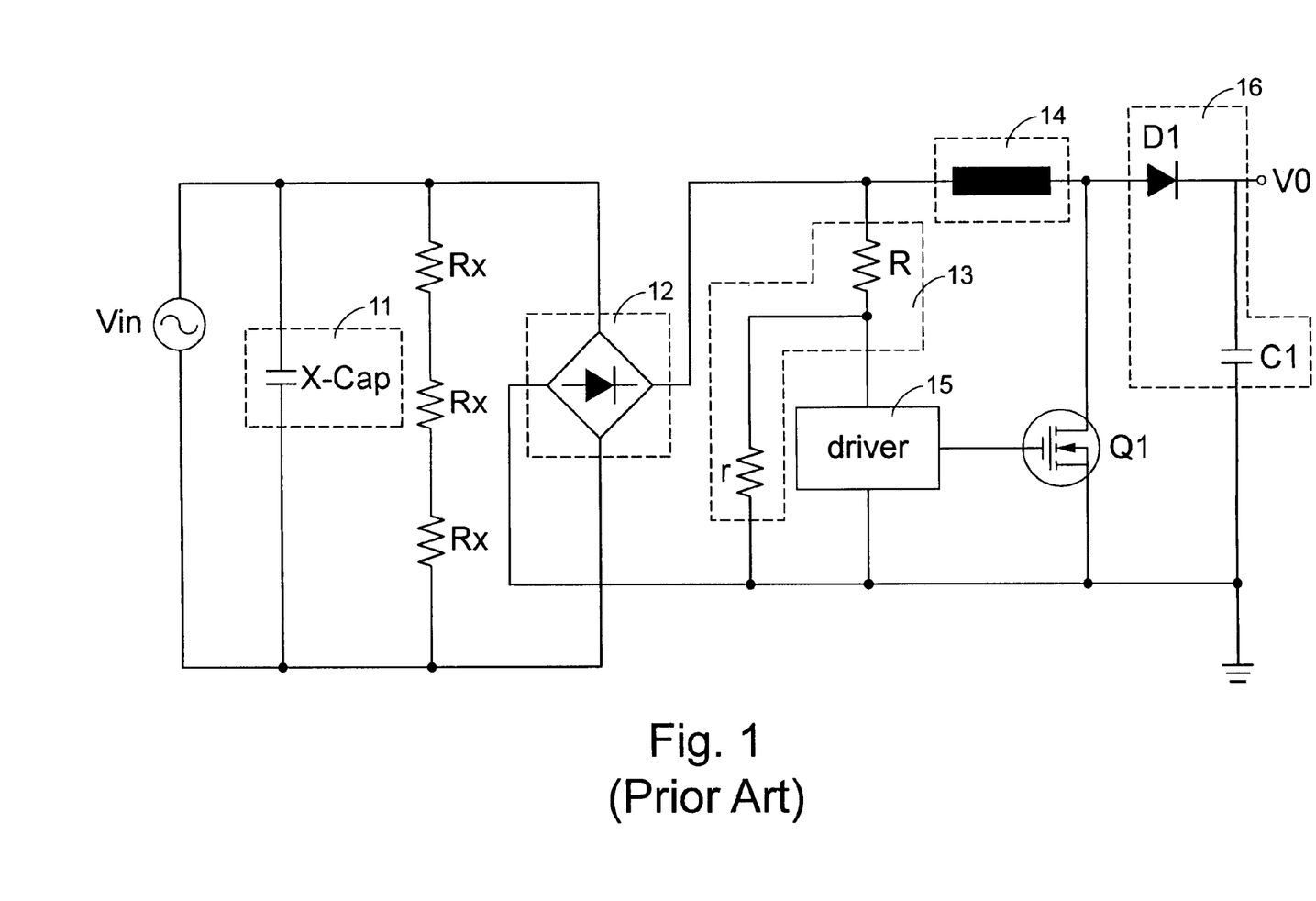
FIG. 1 shows the circuit diagram of a conventional AC/DC adapter.

The circuit configuration of a conventional AC/DC adapter is illustrated in FIG. 1. The AC/DC adapter as shown in FIG. 1 includes an input AC power source Vin, an EMI (electromagnetic interference) filter 11, a bridge rectifier 12, an input power detecting circuit 13, an energy storage device 14, a transistor switch Q1, a driver 15, and an output filter 16. The EMI filter 11 is constituted by an input power filtering capacitor X-cap, which is used to suppress the differential mode noise in the input AC voltage Vin. The input power filtering capacitor X-cap is connected with three serially-connected discharge resistors Rx in parallel, and the discharge resistors Rx are used to provide a discharge path for the input power filtering capacitor X-cap of the EMI filter 11 to release the energy stored therein. The bridge rectifier 12 comprises a plurality of diodes, and is used to perform a full-wave rectification to the input AC voltage Vin. The AC voltage generated by the bridge rectifier 12 is converted to a DC voltage by a DC/AC converter (not shown). The energy storage device 14 is used to store energy while the transistor switch Q1 is ON, and release the energy stored therein to the output filter 16 while the transistor switch Q1 is OFF. The output filter 16 comprises a diode D1 and a capacitor C1, and is used to perform a filtering and smoothing operation to the received DC voltage so as to provide an output DC voltage. The driver 15 is used to control on/off operations of the transistor switch Q1 according to a feedback amount derived from the output DC voltage, and thereby stabilize the output DC voltage. In addition, the AC/DC adapter further includes an input power detecting circuit 13 for sampling the input AC voltage and detecting the variation of the input AC voltage accordingly. The variation of the input AC voltage detected by the input power detecting circuit 13 is provided to the driver 15. Generally, the input power detecting circuit 13 comprises a voltage divider including a resistor R and a resistor r, whereas the resistance of the resistor r is far smaller than that of the resistor R.

Most of the portable electronic devices today are provided with power management facilities, and are able to adjust the allocation of the available power in response to user's demands and build the parameters used in standby mode operation. Thus, the portable electronic devices today are more power-saving than ever before and are able to work for a prolonged period. When the whole system is working under a standby mode, most of the internal circuit elements of the voltage adapter, including the transistor switch Q1 and the driver 15, are all shut down and stop operating. However, some passive circuit elements of the voltage adapter, for example, the discharge resistors Rx and the resistors R and r located within the input power detecting circuit 13, continue to receive the input AC voltage Vin and cause power consumption under standby mode. The senseless power consumption dissipated as a result of the passive circuit elements of the voltage adapter in standby mode operation will increase the overall power consumption of an electronic device.

Therefore, a major target to be pursued by the present invention is focused on the reduction of the power consumption resulted from the passive circuit elements, especially the resistors of the voltage adapter in standby mode operation.

SUMMARY OF THE INVENTION

A major object of the present invention is to provide a voltage adapter capable of conserving power consumption under standby mode.

In a preferred embodiment of the present invention, there is provided a voltage adapter for attaining the object of the present invention. The voltage adapter is used to receive an input voltage and convert the input voltage into an output voltage having a voltage level different from the input voltage, and includes an electromagnetic interference filter for suppressing a differential mode noise of the input voltage, a bridge rectifier connected to the electromagnetic interference filter for performing a full-wave rectification to the input voltage, a transistor switch connected to the bridge rectifier, a driver connected to the transistor switch for controlling on/off operations of the transistor switch according to a feedback amount derived from the output voltage, and a circuit box connected to the electromagnetic interference filter, the bridge rectifier, and the driver for providing a discharge path to the electromagnetic interference filter while sampling the input voltage to detect a variation of the input voltage.

Now the foregoing and other features and advantages of the present invention will be best understood through the following descriptions with reference to the accompanying drawings, wherein:

DETAILED DESCRIPTION OF THE PREFERRED EMBODIMENT

The predominant feature of the present invention is practiced by combining the resistors of the input power detecting circuit being used to detect the variation of the input voltage with the resistors forming the discharge path for the electromagnetic interference filter together, in such manner that the power consumption caused by the passive resistor elements of the voltage adapter is reduced under standby mode.

Detailed descriptions of a preferred embodiment according to the present invention will be given as follows.

Figure 2A:
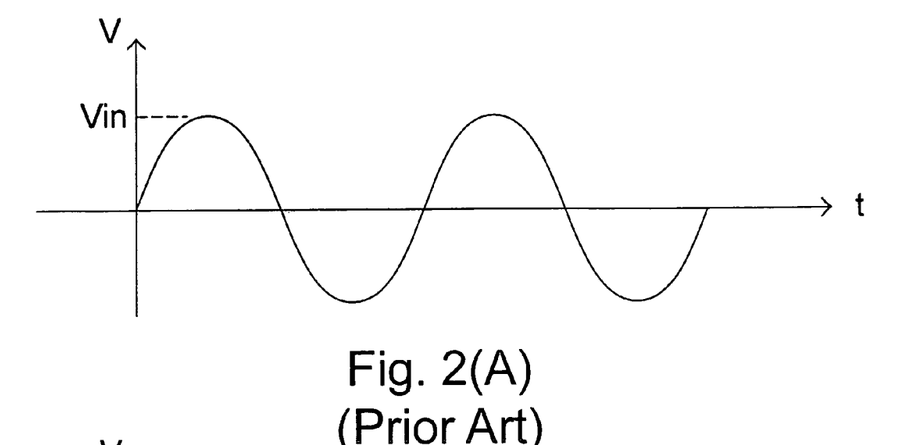
FIGS. 2(A)–2(C) show the voltage waveform diagrams associated with the conventional AC/DC adapter of FIG. 1.
Figure 2B:
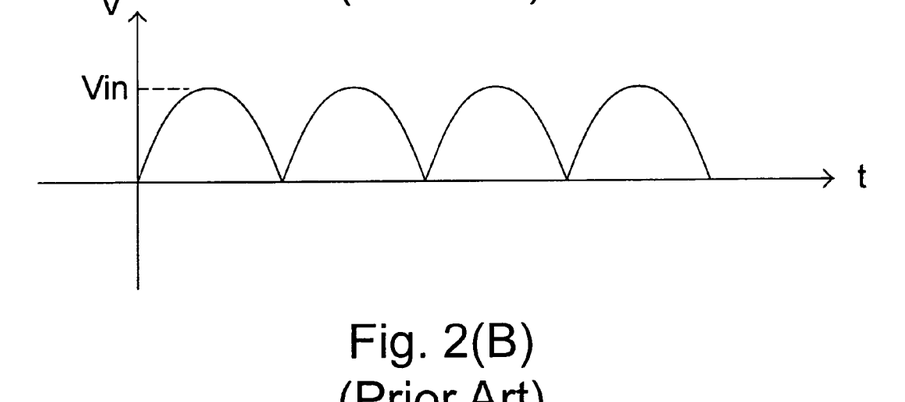
Figure 2C:
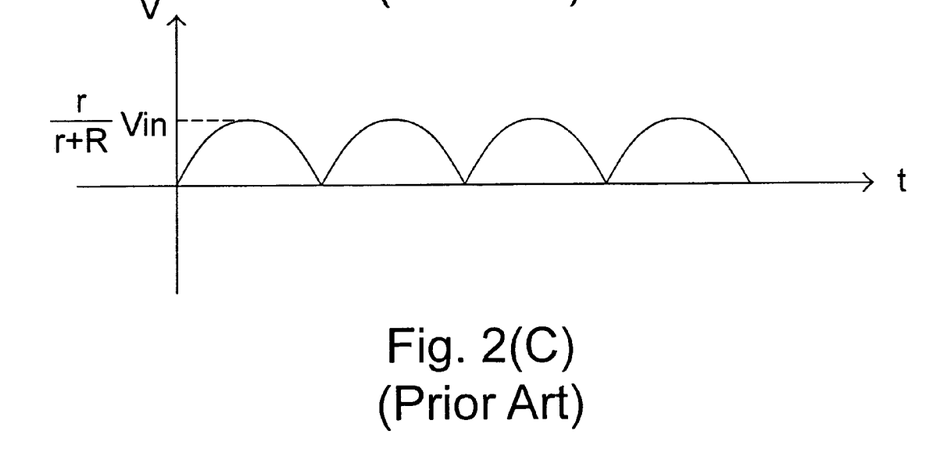

FIGS. 2(A)–2(C) show voltage waveform diagrams associated with the conventional AC/DC adapter of FIG. 1. In these diagrams, FIG. 2(A) shows the voltage waveform of the input AC voltage Vin, FIG. 2(B) shows the voltage waveform of the AC voltage derived from the input AC voltage Vin being full-wave rectified by a bridge rectifier 12, and FIG. 2(C) shows the voltage waveform of the sampled input voltage detected by the input power detecting circuit 13 of FIG. 1. It can be clearly seen from FIG. 2(B) that the resulted AC voltage of the input AC voltage Vin being full-wave rectified has a similar phase with the input AC voltage Vin, but has an amplitude of a positive value, regardless of whether the input AC voltage Vin is going through its positive half cycle or its negative half cycle. In FIG. 2(C), the input power detecting circuit of FIG. 1 uses a voltage divider comprising resistors R and r to sample the input AC voltage and detects the variation of the input AC voltage. Thus the amplitude of the sampled input voltage will be equal to $$\frac{r}{r+R}Vin.$$

The driver 15 shown in FIG. 1 utilizes the sampled input voltage to adjust the power factor of the input voltage and thereby determine the operation voltage range of the input voltage.

Figure 6:
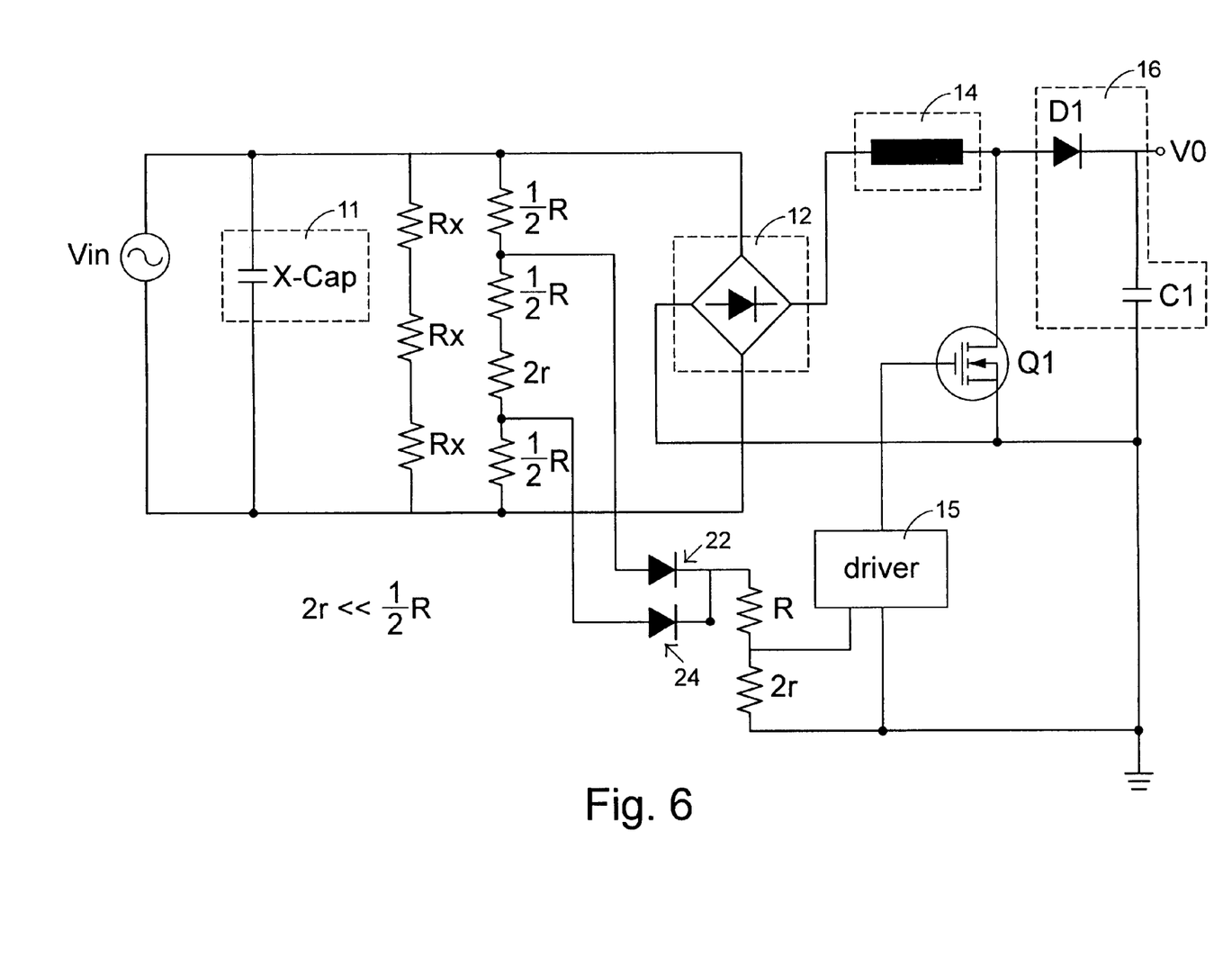
Figure 7:
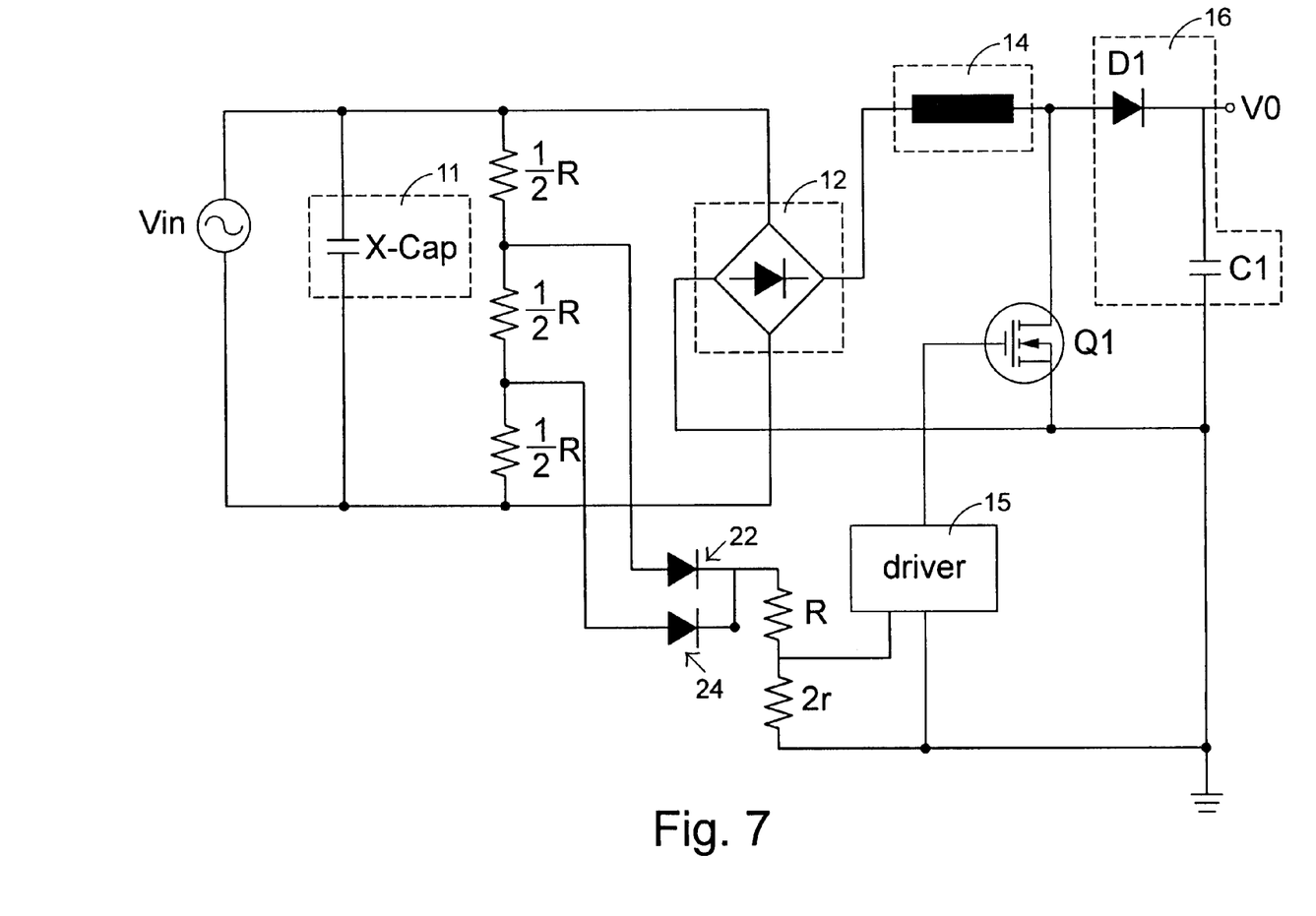
FIG. 7 shows the circuit diagram of the voltage adapter according to the preferred embodiment of the present invention.

FIG. 7 depicts the circuit configuration of the voltage adapter according to a preferred embodiment of the present invention. Next, it is intended to elaborate on the transforming steps of deducing the circuit configuration of FIG. 7 from the circuit configuration of FIG. 1 with reference to the circuit configurations as shown in FIGS. 3 to 6, such that those skilled in the art would be able to realize the spirits and principles contained in the present invention, and further concretize the circuit design norm carried out by the present invention based on the teachings suggested herein.

Figure 3:
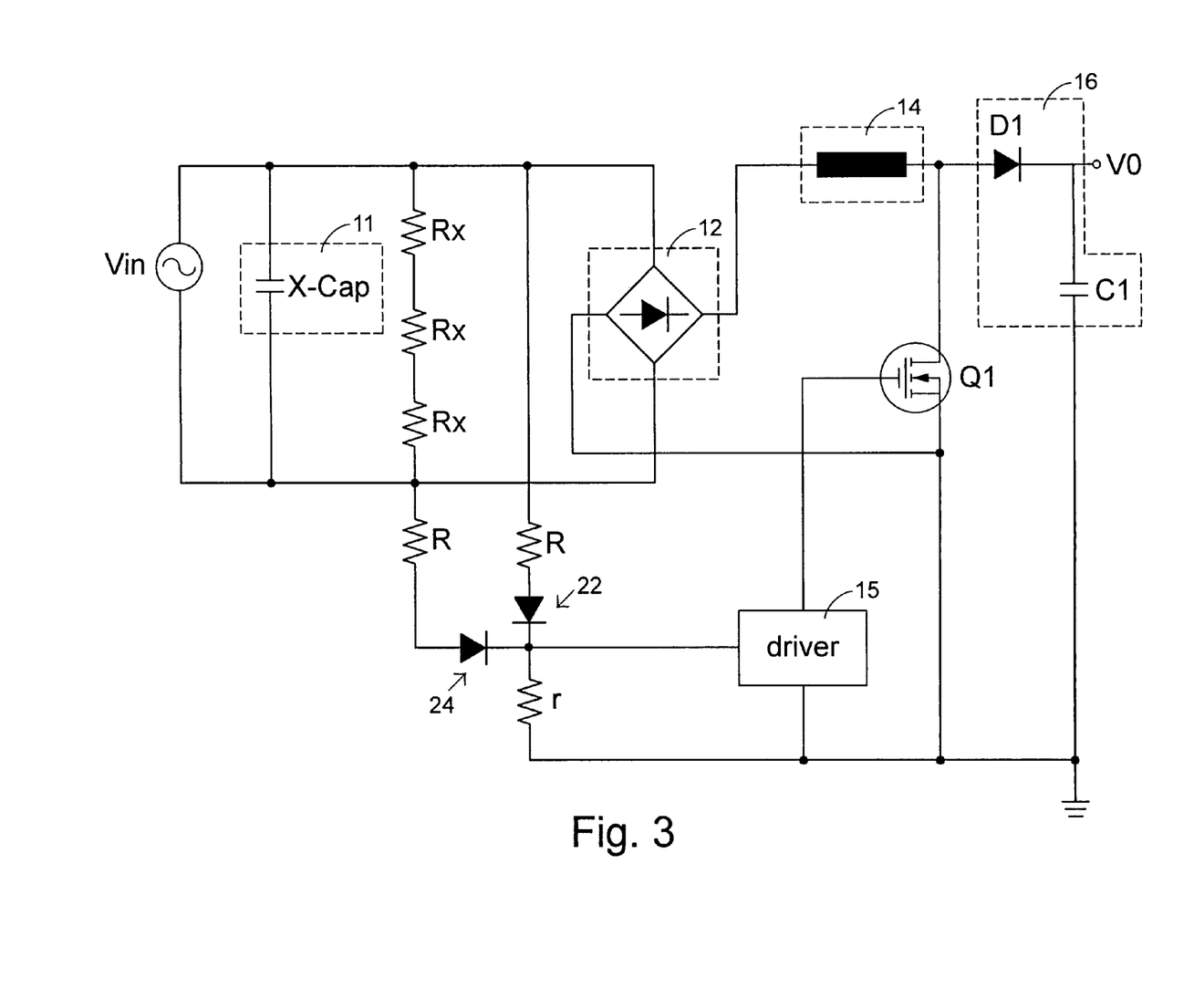
FIGS. 3, 4, 5 and 6 show the equivalent circuit diagrams of the conventional AC/DC adapter of FIG. 1.

Referring to FIG. 3, which is a first equivalent circuit configuration of the voltage adapter of FIG. 1. With reference to the circuit configuration of FIG. 3, the input current will flow through a first diode 22, a resistor R connected between the EMI filter 11 and the first diode 22, and a resistor r connected between the first diode 11, a second diode 24 and the ground terminal during the positive half-cycle of the input AC voltage. During the positive half-cycle of the input AC voltage, the amplitude of the detected sampled input voltage will thus be $$\frac{r}{r+R}Vin,$$

which is a positive value. Similarly, the input current will flow through the second diode 24, a resistor R connected between the discharge resistor Rx and the second diode 24, and the resistor r connected between the first diode 11, the second diode 24 and the ground terminal during the negative half-cycle of the input AC voltage. During the negative half-cycle of the input AC voltage, the amplitude of the detected sampled input voltage will thus be $$\frac{r}{r+R}Vin,$$

which is also a positive value. Therefore, according to the circuit configuration of FIG. 3, the voltage waveform of the sampled input voltage to be inputted to the driver 15 has the same profile with the voltage waveform of the sampled input voltage as shown in FIG. 2(C), and the circuit configuration of the voltage adapter as shown in FIG. 3 can be considered an equivalent circuit of the voltage adapter of FIG. 1.

Figure 4:
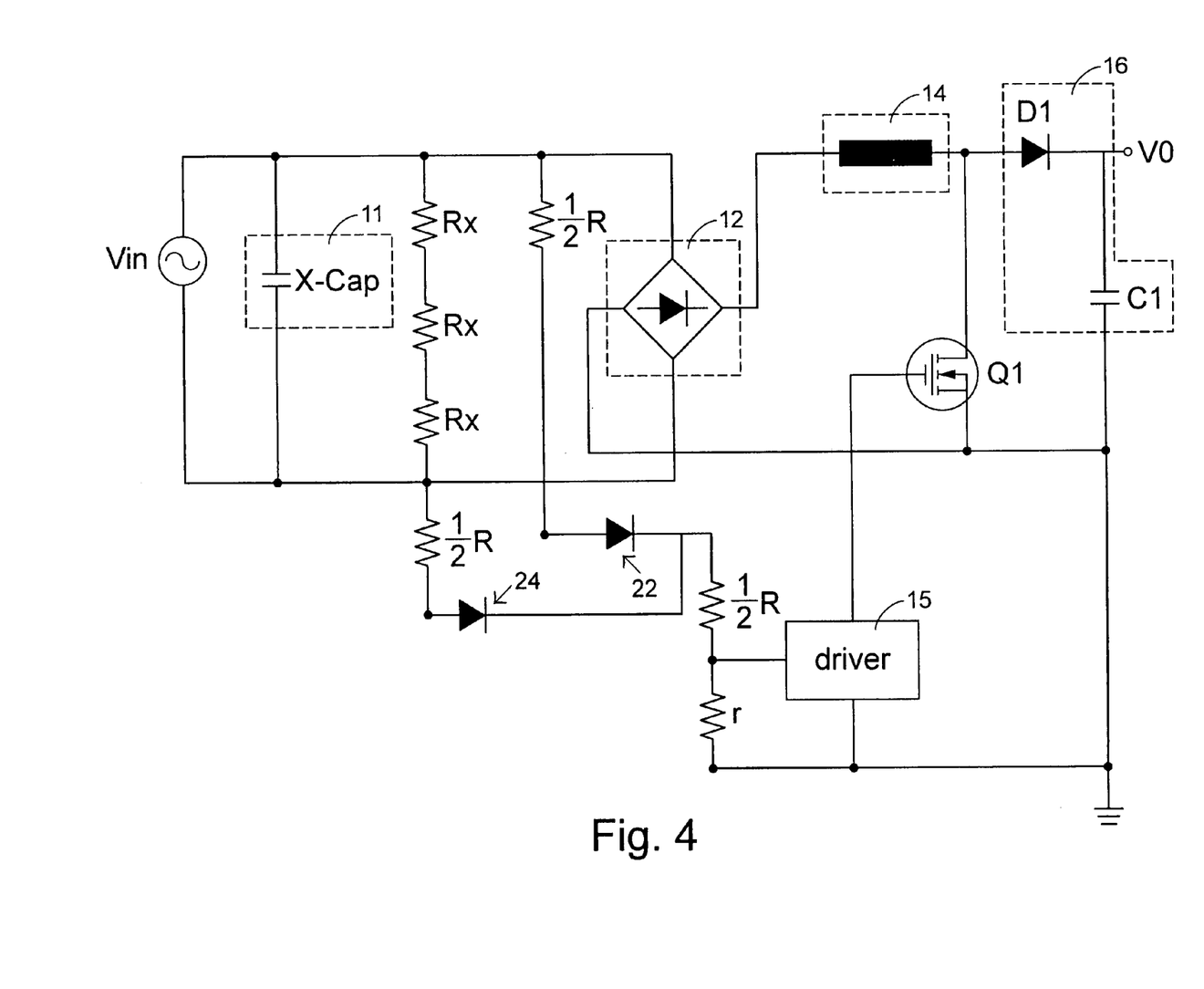

Referring to FIG. 4, which is a second equivalent circuit configuration of the voltage adapter of FIG. 1. With reference to FIG. 4, the input current will flow through the first diode 22, a resistor ½R connected between the EMI filter 11 and the first diode 22, a resistor ½R connected between the first diode 22, the second diode 24 and the driver 15, and a resistor r connected between the driver 15 and the ground terminal during the positive half-cycle of the input AC voltage. Because the two resistors of ½R, ½R mentioned above are connected in series and thus their equivalent resistance is R, they can be considered an equivalence of the resistor R connected between the EMI filter 11 and the first diode 22 as shown in FIG. 3. Therefore, during the positive half-cycle of the input AC voltage, the amplitude of the detected sampled input voltage will still be $$\frac{r}{r+R}Vin,$$

which is a positive value. Similarly, the input current will flow through the second diode 24, a resistor ½R connected between the discharge resistor Rx and the second diode 24, the resistor ½R connected between the second diode 24 and the driver 15, and the resistor r connected between the driver 15 and the ground terminal during the negative half-cycle of the input AC voltage. Because the two resistors of ½R, ½R mentioned above are connected in series and thus their equivalent resistance is R, they can be considered an equivalence of the resistor R connected between the EMI filter 11 and the second diode 24 as shown in FIG. 3. Therefore, during the negative half-cycle of the input AC voltage, the amplitude of the detected sampled input voltage will thus be $$\frac{r}{r+R}Vin,$$

which is also a positive value. In this way, according to the circuit configuration of FIG. 4, the voltage waveform of the sampled input voltage to be inputted to the driver 15 has the same profile with the voltage waveform of the sampled input voltage as shown in FIG. 2(C), and the circuit configuration of the voltage adapter as shown in FIG. 4 can be considered an equivalent circuit of the voltage adapters of FIGS. 1 and 3.

Figure 5:
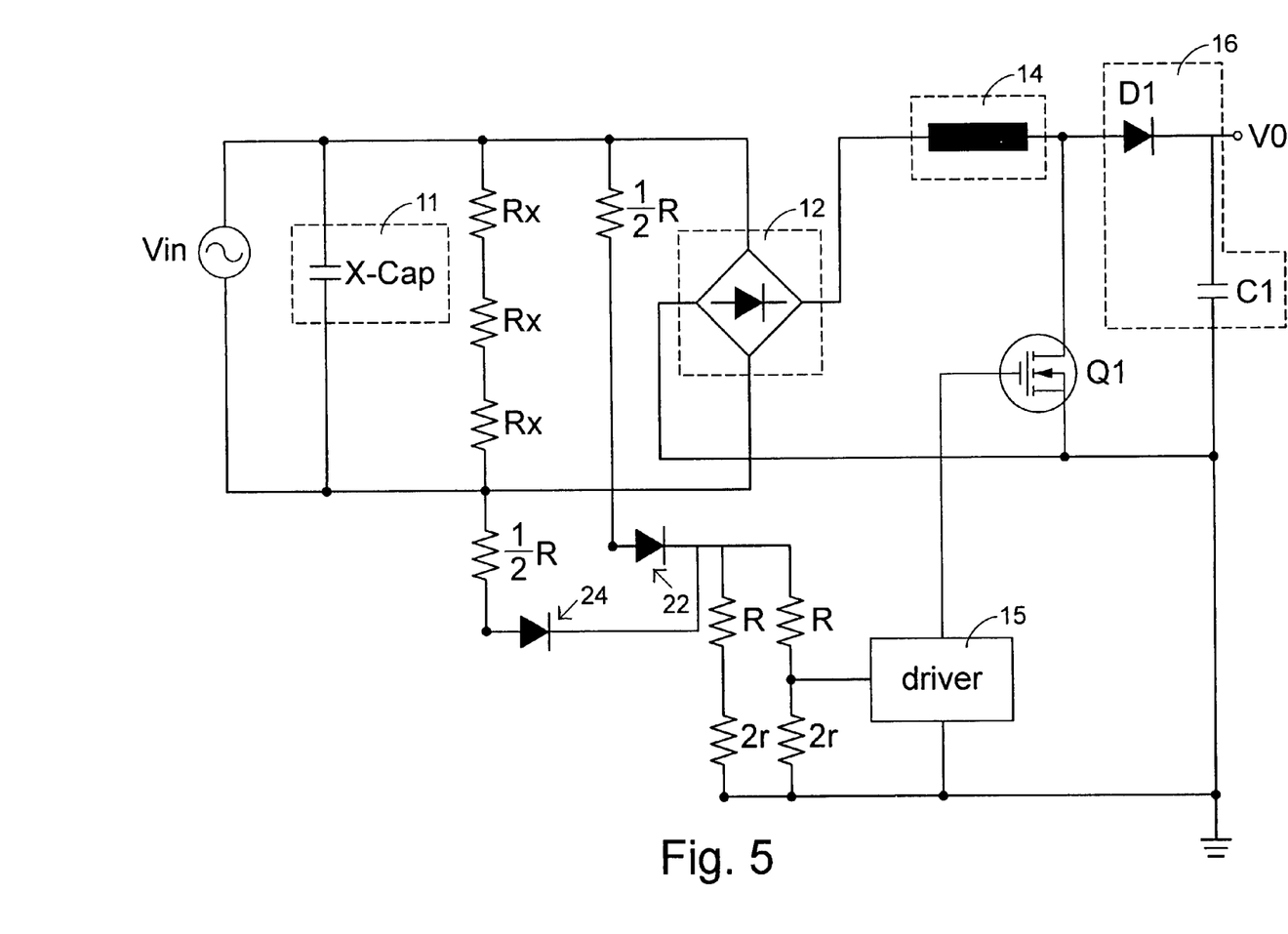

Referring to FIG. 5, which is a third equivalent circuit configuration of the voltage adapter of FIG. 1. With reference to the circuit configuration of FIG. 5, the two parallel-connected resistors R, R and the two parallel-connected resistors 2r, 2r will be combined in parallel to form an equivalent circuit comprising a resistor ½R and a resistor r being connected in series. Therefore, the circuit configuration of FIG. 5 can be considered an equivalent circuit of the circuit configuration of FIG. 4, and also an equivalent circuit of the circuit configurations of FIGS. 1 and 3.

Referring to FIG. 6, which is a fourth equivalent circuit configuration of the voltage adapter of FIG. 1. With reference to the circuit configuration of FIG. 6, the input current will flow through the first diode 22 and the resistor ½R connected between the upper terminal of the EMI filter 11 and the first diode 22, and will divert to the resistors (R+2r) connected between the first diode 22, the second diode 24 and the ground terminal, and the resistors (½R+2r+½R) connected between the first diode 22 and the lower terminal of the EMI filter 11 during the positive half-cycle of the input AC voltage. It is obvious that the resistance of the series combination comprising the resistors (½R+2r+½R) connected between the first diode 22 and the lower terminal of the EMI filter 11 is equivalent to the resistance of (R+2r), and thus the series combination comprising the resistors (½R+2r+½R) connected between the first diode 22 and the lower terminal of the EMI filter 11 can be considered one of the branch circuits of the parallel combination connected between the first diode 22, the second diode 24 and the ground terminal as shown in FIG. 5. Hence, the circuit operation in the positive half-cycle of the input AC voltage according to the circuit configuration of FIG. 6 undergoes the same situation with FIG. 5. During the negative half-cycle of the input AC voltage, the input current will flow through the second diode 24 and the resistor ½R connected between the lower terminal of the EMI filter 11 and the second diode 24, and will divert to the resistors (R+2r) connected between the first diode 22, the second diode 24 and the ground terminal, and the resistors (½R+2r+½R) connected between the upper terminal of the EMI filter 11 and the second diode 24. It is obvious that the resistance of the series combination comprising the resistors (½R+2r+½R) connected between the upper terminal of the EMI filter 11 and the second diode 24 is equivalent to the resistance of (R+2r), and thus the series combination comprising the resistors (½R+2r+½R) connected between the upper terminal of the EMI filter 11 and the second diode 24 can be considered one of the branch circuits of the parallel combination connected between the first diode 22, the second diode 24 and the ground terminal as shown in FIG. 5. Hence, the circuit operation in the negative half-cycle of the input AC voltage according to the circuit configuration of FIG. 6 undergoes the same situation with FIG. 5. In this manner, the circuit configuration of FIG. 6 can be considered an equivalence to the voltage configurations of FIG. 1, FIG. 3, FIG. 4, and FIG. 5.

Here we designate the resistor ½R connected between the anode of the first diode 22 and the EMI filter 11 (input power filtering capacitor X-cap) as a first resistor, the resistor (½R+2r) connected between the anode of the first diode 22 and the anode of the second diode 24 as a second resistor, the resistor ½R connected between the anode of the second diode 24 and the EMI filter 11 (input power filtering capacitor X-cap) as a third resistor, the resistor R connected between the cathode of the first diode 22, the cathode of the second diode 24, and the driver 15 as a fourth resistor, and the resistor 2r connected between the driver 15 and the ground terminal as a fifth resistor.

Next, because the function of the three serially-connected discharge resistors Rx as shown in the circuit configuration of FIG. 6 is to provide a discharge path for the input power filtering capacitor X-cap only, the discharge capacitors Rx can be merged with the first resistor, the second resistor and the third resistor. That is, the discharge resistors Rx can be eliminated, and the circuit box comprising the first resistor, the second resistor and the third resistor can be used to replace the discharge resistors as the unit that provides a discharge path for the input power filtering capacitor X-cap. Moreover, because the component ½R of the second resistor is far larger than the other component 2r of the second resistor, the resistance of the second resistor can be approximated to ½R. Through the aforementioned steps to simplify the complexity of the circuit configuration of the voltage adapter, the circuit configuration of the voltage adapter according to a preferred embodiment of the present invention can be concluded in the circuit diagram of FIG. 7.

The above description has fully illustrated the procedural steps of how to attain the circuit configuration of the voltage adapter according to the present invention through the evolvement with a series of equivalent circuits obtained by modifying the circuit configuration of the conventional voltage adapter with the replacement and integration of its circuit elements. It can be understood from the circuit diagram of FIG. 7 that the voltage adapter of the present invention provides an advantage that reduces the power consumption under standby mode resulted from the power loss caused by the passive resistor elements. This is done by placing a circuit box in the voltage adapter of the present invention that provides a discharge path for the EMI filter while detecting the variation of the input voltage by processing the input voltage with a sampling operation. In a detailed aspect of the present invention, the constitution of the circuit box includes a first resistor ½R having a first terminal connected to the EMI filter 11 and a second terminal; a second resistor ½R having a first terminal connected to the second terminal of the first resistor and a second terminal; a third resistor ½R having a first terminal connected to the second terminal of the second resistor and a second terminal connected to the EMI filter 11; a first diode 22 having a first terminal connected commonly to the first terminal of second resistor and the second terminal of the first resistor, and a second terminal; a second diode 24 having a first terminal connected commonly to the first terminal of third resistor and the second terminal of the second resistor, and a second terminal; a fourth resistor R having a first terminal connected commonly to the second terminal of the first diode 22 and the second terminal of the second diode 24, and a second terminal connected to the driver 15; and a fifth resistor 2r having a first terminal connected to the second terminal of the fourth resistor, and a second terminal connected to the ground terminal. Compared to the conventional voltage adapter of FIG. 1, the power loss induced in standby mode operation within the voltage adapter of the present invention is equal to $$\frac{Vin^2}{\frac{1}{2}R+\frac{1}{2}R+r},$$

while the power loss induced in standby mode operation within the conventional voltage adapter of FIG. 1 is equal to $$\frac{Vin^2}{3Rx}+\frac{Vin^2}{R+r}.$$

According to the present invention, the resistance of the resistors (½R+½R+r) should be equivalent to 3Rx, and thereby the voltage adapter of the present invention can reduce the standby mode power consumption by an amount up to $$\frac{Vin^2}{R+r}.$$

Therefore, the present invention is competent to substantially reduce the power loss induced in the standby mode operation from the passive resistor elements, and further conserve the overall power consumption.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage adapter for receiving an input voltage and converting the input voltage into an output voltage having a voltage level different from the input voltage, the voltage adapter comprising:
   an electromagnetic interference filter for suppressing a differential mode noise of the input voltage;
   a bridge rectifier connected to the electromagnetic interference filter for performing a full-wave rectification to the input voltage;
   a transistor switch connected to the bridge rectifier;
   a driver connected to the transistor switch for controlling on/off operations of the transistor switch according to a feedback amount derived from the output voltage; and
   a circuit box connected between the electromagnetic interference filter, the bridge rectifier and the driver for providing a discharge path for the electromagnetic interference filter, while sampling the input voltage to detect a variation of the input voltage.

2. The voltage adapter according to claim 1 wherein the voltage adapter is an AC/DC adapter.

3. The voltage adapter according to claim 1 wherein the electromagnetic interference filter comprises at least an input power filtering capacitor.

4. The voltage adapter according to claim 1 wherein the bridge rectifier comprises a plurality of diodes.

5. The voltage adapter according to claim 1 further comprising an energy storage device connected between the bridge rectifier and the transistor switch for transferring a DC voltage.

6. The voltage adapter according to claim 5 further comprising an output filter connected to the energy storage device for performing a filtering and smoothing operation to the DC voltage.

7. The voltage adapter according to claim 6 wherein the output filter comprises a diode and a capacitor.

8. The voltage adapter according to claim 1 wherein the circuit box comprising:
   a first resistor having a first terminal connected to the electromagnetic interference filter, and a second terminal;
   a second resistor having a first terminal connected to the second terminal of the first resistor, and a second terminal;
   a third resistor having a first terminal connected to the second terminal of the second resistor, and a second terminal connected to the electromagnetic interference filter;
   a first diode having a first terminal connected to the first terminal of the second resistor and the second terminal of the first resistor, and a second terminal;
   a second diode having a first terminal connected to the first terminal of the third resistor and the second terminal of the second resistor, and a second terminal;
   a fourth resistor having a first terminal connected to the second terminal of the first diode and the second terminal of the second diode, and a second terminal connected to the driver; and
   a fifth resistor having a first terminal connected to the second terminal of the fourth resistor, and a second terminal connected to ground.

9. A voltage adapter for receiving an input voltage and converting the input voltage into an output voltage having a voltage level different from the input voltage, the voltage adapter comprising:
   an electromagnetic interference filter for suppressing a differential mode noise of the input voltage;
   a bridge rectifier connected to the electromagnetic interference filter for performing a full-wave rectification to the input voltage;
   a transistor switch connected to the bridge rectifier;
   a driver connected to the transistor switch for controlling on/off operations of the transistor switch according to a feedback amount derived from the output voltage; and
   a circuit box connected between the electromagnetic interference filter, the bridge rectifier and the driver for providing a discharge path for the electromagnetic interference filter, while sampling the input voltage to detect a variation of the input voltage;
   wherein the circuit box comprising:
   a first resistor having a first terminal connected to the electromagnetic interference filter, and a second terminal;
   a second resistor having a first terminal connected to the second terminal of the first resistor, and a second terminal;
   a third resistor having a first terminal connected to the second terminal of the second resistor, and a second terminal connected to the electromagnetic interference filter;
   a first diode having a first terminal connected to the first terminal of the second resistor and the second terminal of the first resistor, and a second terminal;
   a second diode having a first terminal connected to the first terminal of the third resistor and the second terminal of the second resistor, and a second terminal;
   a fourth resistor having a first terminal connected to the second terminal of the first diode and the second terminal of the second diode, and a second terminal connected to the driver; and
   a fifth resistor having a first terminal connected to the second terminal of the fourth resistor, and a second terminal connected to ground.

10. The voltage adapter according to claim 9 wherein the voltage adapter is an AC/DC adapter.

11. The voltage adapter according to claim 9 wherein the electromagnetic interference filter comprises at least an input power filtering capacitor.

12. The voltage adapter according to claim 9 wherein the bridge rectifier comprises a plurality of diodes.

13. The voltage adapter according to claim 9 further comprising an energy storage device connected between the bridge rectifier and the transistor switch for transferring a DC voltage.

14. The voltage adapter according to claim 13 further comprising an output filter connected to the energy storage device for performing a filtering and smoothing operation to the DC voltage.

15. The voltage adapter according to claim 14 wherein the output filter comprises a diode and a capacitor.

* * * * *